July 29, 1958  J. K. MERTZWEILER  2,845,467
PROCESS FOR TREATING POLYMERS PRODUCED BY
ALKALI-METAL CATALYZED POLYMERIZATIONS
WITH ACIDIC CATIONIC EXCHANGE RESINS
Filed Dec. 21, 1954
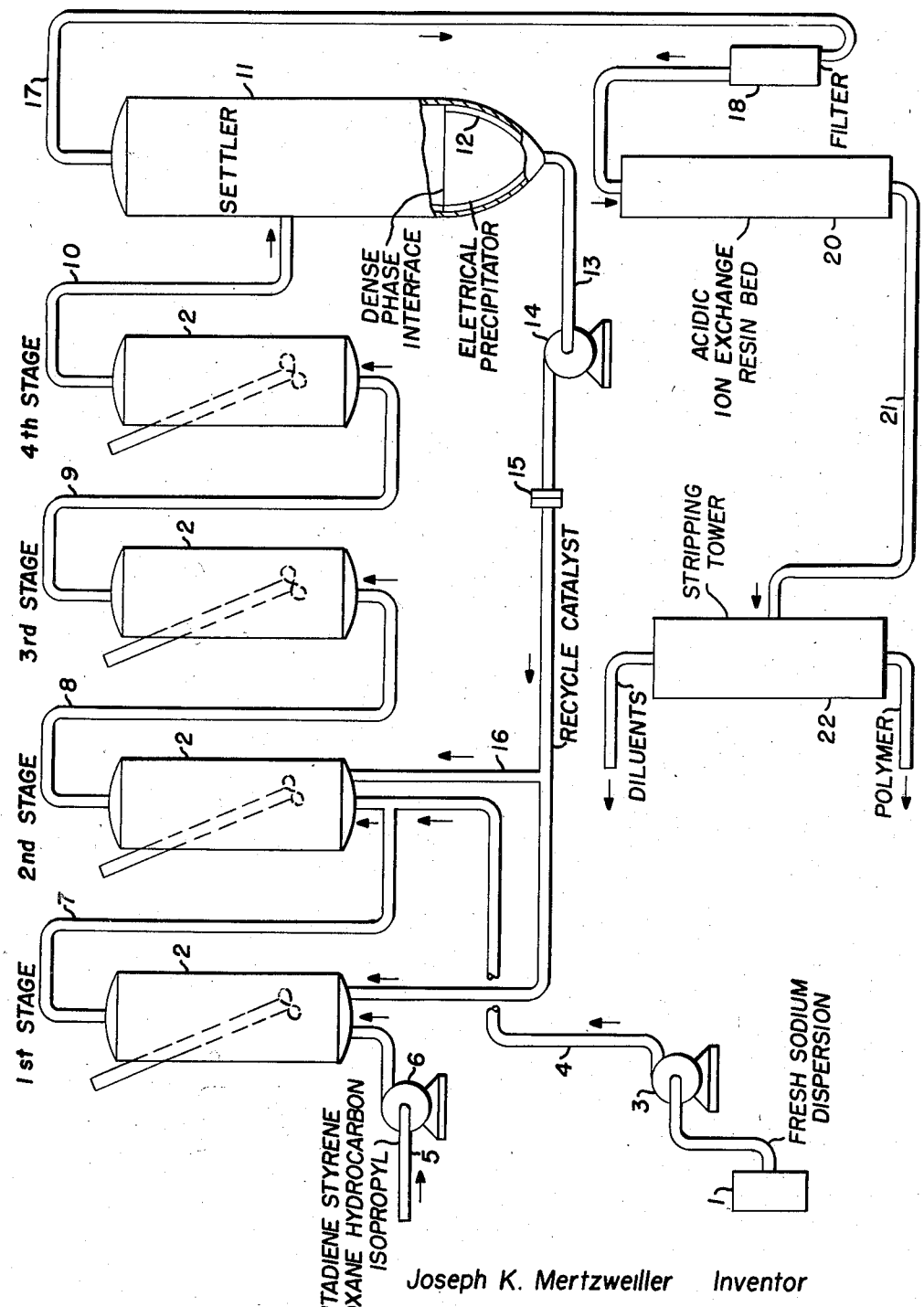
Joseph K. Mertzweiller  Inventor
By  Attorney United States Patent Office 2,845,467
Patented July 29, 1958

2,845,467

PROCESS FOR TREATING POLYMERS PRODUCED BY ALKALI-METAL CATALYZED POLYMERIZATIONS WITH ACIDIC CATIONIC EXCHANGE RESINS

Joseph Kern Mertzweiller, Baton Rouge, La., assignor to Esso Research and Engineering Company, a corporation of Delaware Application December 21, 1954, Serial No. 476,802

9 Claims. (Cl. 260—669)

This invention relates to an improved method for treating polymers produced by alkali metal catalyzed polymerization. In one embodiment it relates to a method for the recovery of liquid polymers from the alkali metal catalyzed polymerization of conjugated diolefins wherein the product is substantially free from the catalyst. In one specific embodiment this invention relates to treating liquid polymers produced by solution copolymerization of 1,3-butadiene and styrene in the presence of metallic sodium as a catalyst wherein the resulting treated product is substantially free of sodium and sodium compounds The polymerization of conjugated diolefins, such as 1,3-butadiene with or without comonomers such as vinyl aromatics, including styrene, in the presence of alkali metal catalysts such as sodium, potassium, lithium, caesium or rubidium in the presence or absence of a solvent is well known. Solid or liquid polymers may be produced using these catalysts. Liquid polymers are readily formed by operating at relatively high temperatures or with relatively large amounts of catalyst and in the presence of a solvent, such as naphtha, Varsol, heptane, or the like to obtain a solution of a liquid polymer in the solvent.

In the alkali metal polymerization of conjugated diolefins and the like it is necessary to treat the resulting reaction mixture in some manner to remove the alkali metal and reactive alkali metal organic compounds present to prevent contamination of the product with the catalyst.

It has been known in the art to remove the alkali metal catalysts by treatment with water whereby the catalysts are converted to alkali metal hydroxides. However, it is difficult to remove the last traces of the hydroxides from the polymer. Furthermore, the presence of the hydroxides in the polymer is deleterious for many purposes. They increase the curing rate of some rubbers and tend to render liquid drying oils cloudy and cause undesirable reactions when compounding the oils in paints, etc.

It is therefore a major object of this invention to provide an improved method for treating polymers produced by polymerization of conjugated diolefins in the presence of an alkali metal catalyst.

It is another object of the invention to treat a liquid polymer prepared by polymerization of conjugated diolefins in the presence of an alkali metal catalyst whereby the resulting treated polymer contains substantially no alkali metal catalyst or compound thereof.

It is still another object of this invention to treat a liquid copolymer prepared by copolymerization of conjugated diolefins and aromatic compounds containing a vinyl group in the presence of an alkali metal catalyst whereby the resulting treated copolymer contains substantially no alkali metal catalyst or compound thereof.

Still another object of this invention is to remove in a novel and efficient manner sodium and sodium-organic compounds from a liquid copolymer of butadiene and styrene containing the same.

It is still a further object of this invention to remove finely divided dispersed alkali metal and compounds thereof from a hydrocarbon liquid.

Another object of this invention is to remove alkali metal alkyls, and similarly highly reactive compounds of alkali metals, from inert liquids.

A specific object of this invention is to copolymerize a conjugated diolefin and a vinyl aromatic in the presence of a finely dispersed alkali metal and to subsequently recover a resulting polymeric material free from alkali metal and compounds thereof.

Other objects and advantages of this invention will become apparent from the following description and drawings.

It has now been found that these and other objects of this invention can be accomplished by treating the reaction product from the solution polymerization of conjugated diolefins in the presence of alkali metal catalysts to remove the bulk of the catalyst as by centrifuging, settling or filtering and then contacting the resulting liquid effluent with acidic cationic ion exchange resins. The ion exchange resin used is any high molecular weight polymer containing cationic groupings as integral parts of the polymer structure. Specifically such resins contain phenolic, sulfonic, carboxylic, phosphonic acid groups as an integral portion of the resin and an equivalent amount of cations.

When treating a polymer solution in accordance with this invention, the suspended alkali metal is substantially removed by the preliminary settling, centrifuging, filtering, or the like. It may be desirable to first subject the solution containing the dispersed catalyst to the action of an electrical precipitator so that the metal particles are condensed and can be removed by any one of the methods suggested above. The separated catalyst can then be redispersed and recycled to the reaction zone. The catalyst free solution still contains dissolved therein a small amount of alkali-metal alkyls or other organo-metallic compounds of the alkali metals. This solution is passed through a column containing the ion exchange resins. It is, of course, necessary that the resin be pretreated with acid so that hydrogen atoms become available for exchange with the alkali metal of the metallo-organic compounds present in the polymer solution. Suitable ion exchange resins are formed by the reaction of an aldehyde, such as formaldehyde, a phenol such as resorcinol and a sulfonic acid such as benzaldehyde-2,4-disulfonic acid by methods well known in the art. A particularly effective type of resin is that known as Amberlite-IR–105 manufactured by Rohm and Haas and containing phenolic and methylene sulfonic cation exchange groups. (See "Ion Exchange Resins" by Robert Kunin and Robert J. Myers, John Wiley & Sons, 1950.)

In order to set forth more specifically the process of this invention, reference is made to the accompanying drawing.

A finely divided suspension of alkali metal catalyst from the catalyst preparation system 1 is introduced into the second stage of reaction system 2 by means of pump 3 and line 4. Simultaneously a mixture of butadiene, styrene, dioxane, isopropyl alcohol and hydrocarbon diluent are fed into the first stage of the reactor system 2 by line 5 and pump 6.

Reactor system 2 is shown to consist of 4 stages, but may consist of any number of stages in excess of 1. The reaction is carried out so that only partial conversion is reached in the first stage. The reaction mixture overflows from the stage 1 to stage 2 through the line 7 and thence passes from stage to stage through the connecting lines 8 and 9. Final 100% conversion is obtained in the last stage. The greater the number of stages the more nearly the process approaches a batch process. Dioxane is added with the feed to control the reaction, and to give a colorless product. Isopropyl alcohol is added in small quantities as a catalyst activator. A mixture of polymers, inert diluents, dioxane and alcohol is withdrawn from stage 4 through line 10 and introduced into settling zone 11. Here the polymer solution is allowed to settle with the formation of a lower dense phase catalyst suspension beneath an upper clear supernatant liquid. An electrical precipitator 12 may be placed in the bottom of the settler to facilitate agglomeration and settling of the catalyst. The dense phase catalyst suspension is withdrawn from the bottom of settler 11 through line 13 and pump 14. The withdrawn suspension is passed through orifice 15 to redisperse the sodium and is then passed to stage 1 of the reactor system 2. If desired it may also be passed to other stages as by line 16.

The clear supernatant polymer solution is withdrawn from settler 11 through line 17 and passed through filter 18 to separate any small amount of gel which may be present. The filtered solution is then passed by line 19 to column 20 containing an acidic cationic exchange resin. In this column the sodium of the sodium alkyl in the solution is exchanged for the replaceable hydrogen ion on the resin and is thus effectively removed from the system. The column of resin in actual application consists of two beds arranged in parallel, so that one bed is on stream while the other is being regenerated. This regeneration may be suitably accomplished by washing with water or by steaming. It is advisable to treat the resin with acetone or dioxane to remove the residual water from the resin. Dioxane is to be preferred since the use of this material does not introduce any extraneous material into the system.

After the polymer solution is contacted with the resin bed it is passed by line 21 to stripping tower 22 where hydrocarbon diluents, dioxane and alcohol are removed overhead through line 23 and recycled to the process. Polymer is withdrawn through line 24 to storage.

The following example will more fully illustrate the invention, but the invention is not to be restricted to the conditions contained therein.

*Example*

A two-liter stainless steel reactor was charged with 80 parts of butadiene-1,3, 20 parts of styrene, 200 parts of straight-run mineral spirits having a boiling range of 150 to 200° C., 20 parts of dioxane-1,4, 1.5 parts of finely divided sodium, and 0.2 parts of isopropanol. The reaction mixture was heated with agitation at 50° C. for 10 hours, whereby complete conversion of monomers was obtained. A portion of crude polymer solution was centrifuged and filtered through fluted paper to give a water-white product free of any suspended material. A drop of phenolphthalein solution added to the filtered polymer solution gave an intense red color indicating residual alkalinity. A portion of the centrifuged and filtered solution was shaken with a small amount of an acidic ion exchange resin containing phenolic and methylene sulfonic cationic groups attached to a resin body and known as Amberlite-IR-105 manufactured by Rohm and Haas Company. The mixture was then filtered to remove the resin and the filtrate was tested with phenolphthalein. The test showed no residual alkalinity.

Having described and illustrated the invention it will be understood that various embodiments not specifically illustrated herein are possible without departing from the spirit of the invention. For example, it is within the scope of the present invention to omit the preliminary settling, centrifuging, filtering or other separating step and conduct the polymer solution directly to the ion exchange column. In this embodiment the free alkali metal as well as the combined form is exchanged for the hydrogen on the resin.

Other modifications will be apparent to those skilled in the art.

The present invention having thus been fully described and illustrated, what is claimed as new and useful and desired to be secured by Letters Patent is:

1. A method for treating a liquid polymer solution produced by solution polymerization of a conjugated diolefin in the presence of an alkali metal catalyst and which contains alkali metal and organo-alkali metal compounds as impurities which comprises treating said liquid polymer solution with an acidic cationic exchange resin thereby removing the metal and organo-metal compounds from said polymer solution.

2. Process according to claim 1 in which the polymer solution is first treated to remove the free alkali metal and then treated with the ion exchange resin to remove the organo-alkali metal compounds.

3. Process according to claim 2 in which the alkali metal is removed by centrifuging.

4. Process according to claim 2 in which the alkali metal is removed by filtering.

5. Process according to claim 2 in which the alkali metal is removed by settling.

6. In a process for the treatment of a liquid copolymer produced by solution polymerization of 1,3-butadiene and styrene in the presence of an alkali metal catalyst and in which a resulting copolymer solution is obtained which contains alkali metal and organo-alkali metal compounds as impurities, the improvement which comprises treating the resulting liquid polymer solution to separate the alkali metal and then contacting the resulting alkali metal-free solution with an acidic cationic exchange resin to effect exchange of the alkali metal in the organo-alkali metal compound with the hydrogen in the resin.

7. A process for preparing a liquid polymer solution which comprises copolymerizing a mixture of butadiene and styrene in the presence of finely divided sodium as catalyst and a hydrocarbon diluent, whereby a polymer solution containing finely divided suspended sodium metal and dissolved organo-sodium compounds are formed, settling and separating the suspended sodium from the polymer solution and recycling it to the polymerization, and contacting the sodium-free polymer solution with an acidic cationic exchange resin to effect the exchange of the sodium in the organo-sodium compound for the hydrogen in the cationic resin.

8. A process for removing organo-metallic compounds of alkali metals which are present as impurities in a liquid hydrocarbon which comprises intimately contacting said hydrocarbon with an acidic cationic exchange resin whereby the alkali metal in the metallo-organic compound is exchanged with the hydrogen in the exchange resin.

9. Process according to claim 8 in which said alkali metal is sodium.

References Cited in the file of this patent

UNITED STATES PATENTS

| | | |
|---|---|---|
| 2,264,811 | Rothrock | Dec. 2, 1941 |
| 2,367,803 | Schindler | Jan. 23, 1945 |
| 2,566,353 | Mills | Sept. 4, 1951 |
| 2,687,443 | Douthitt | Aug. 24, 1954 |

OTHER REFERENCES

Nachod: Ion Exchange, Academic Press Inc. (1949), New York (pages 370–371 relied on).

Bodamer: "Ind. and Eng. Chem.," vol. 45, November 1953 pages 2577–2580.